(12) United States Patent
Kneckt et al.

(10) Patent No.: US 8,411,632 B2
(45) Date of Patent: Apr. 2, 2013

(54) TRANSMISSION PROTECTION SCHEME

(75) Inventors: Jarkko Kneckt, Espoo (FI); Mika Kasslin, Espoo (FI)

(73) Assignee: Nokia Corporation, Espoo (FI)

( * ) Notice: Subject to any disclaimer, the term of this patent is extended or adjusted under 35 U.S.C. 154(b) by 341 days.

(21) Appl. No.: 12/939,478

(22) Filed: Nov. 4, 2010

(65) Prior Publication Data

US 2012/0113903 A1    May 10, 2012

(51) Int. Cl.
*H04W 4/00* (2009.01)
*H04B 7/216* (2006.01)
*H04L 12/26* (2006.01)

(52) U.S. Cl. ........ 370/329; 370/252; 370/328; 370/338; 375/260; 380/35

(58) Field of Classification Search .......... 370/312–401; 375/260, 295, E7.002; 380/35–37
See application file for complete search history.

(56) References Cited

PUBLICATIONS

IEEE 802.11-09/0992r15, "IEEE P802.11 Wireless LANs, Specification Framework for TGae", Robert Stacey, Intel, Sep. 2010, (27 pages).

*Primary Examiner* — Afsar Qureshi
(74) *Attorney, Agent, or Firm* — Harrington & Smith (57) ABSTRACT

A method, apparatus, and computer program for protecting transmissions are provided. A wireless communication apparatus receives a physical layer convergence protocol header of a transmission on a frequency band and determines from header information included in the header, whether or not there are further transmissions associated with the transmission and after the transmission on the frequency band. In response to determining on the basis of the header information that there will be at least one other transmission after the transmission on the frequency band, channel access of the wireless communication apparatus is suspended on the frequency band for a determined time period after the transmission, the determined time period including a transmission time interval of the at least one other transmission.

22 Claims, 3 Drawing Sheets

TRANSMISSION PROTECTION SCHEME

FIELD

The invention relates to the field of wireless telecommunications and, particularly, to reserving transmission resources in a wireless telecommunication system.

BACKGROUND

Wireless Local Area Network (WLAN) has undergone vast development in order to increase throughput. Task groups such as 802.11b, 802.11a, 802.11g and 802.11n have demonstrated continuous improvement of the WLAN radio throughput. 802.11ac is another task group that is developing the WLAN radios that operate at a frequency spectrum below 6 GHz and especially at 5 GHz. There exist other task groups within the IEEE 802.11 standardization.

Channelization rules for 802.11ac radios are currently under development. The rules define the frequency channels available for 802.11ac transmitters. The rules are based on a scheme of a primary channel and secondary channels. The scheme follows a principle where each network or basic service set (BSS) has a primary channel and zero or more secondary channels. The primary channel is used for channel contention, and transmission opportunity (TXOP) is gained based on carrier sensing on the primary channel.

BRIEF DESCRIPTION

According to an aspect of the present invention, there is provided a method comprising: receiving, in a wireless communication apparatus, a physical layer convergence protocol header of a transmission on a frequency band; determining from header information comprised in the physical layer convergence protocol header whether or not at least one subsequent transmission associated with the transmission is expected on the frequency band after the transmission; and in response to determining on the basis of the header information that there will be at least one subsequent transmission after the transmission on the frequency band, suspending channel access of the wireless communication apparatus on the frequency band for a determined time period after the transmission, the determined time period comprising a transmission time interval of the at least one subsequent transmission.

In an embodiment, the transmission is a data transmission, and the method further comprises: determining from the header information comprised in the physical layer convergence protocol header whether or not an acknowledgment message is expected for the data transmission; and in response to determining on the basis of the header information that said acknowledgment message is expected after the data transmission in the radio interface, suspending the channel access of the wireless communication apparatus for said determined time period comprising a transmission time interval of the acknowledgment message.

In an embodiment, the transmission is carried out on a plurality of channels comprising a primary channel always used in transmission by a transmitter apparatus and at least one auxiliary channel selectively used by the transmitter apparatus as additional bandwidth, and wherein a separate physical layer convergence protocol header is provided on the primary channel and the at least one auxiliary channel, the method further comprising receiving the physical layer convergence protocol header of the transmission on at least one auxiliary channel of the transmitter apparatus.

In an embodiment, the method further comprises: determining, on the basis of the header information, whether the transmission is destined to a single recipient apparatus to a plurality of recipient apparatuses addressed by a group address, or a plurality of individually addressed recipient apparatuses; in response to determining on the basis of the header information that the transmission is to single recipient apparatus or the plurality of individually addressed recipient apparatuses, suspending the channel access of the wireless communication apparatus for the determined time period after the transmission, the determined time period comprising a transmission time interval of the at least one subsequent transmission; and in response to determining on the basis of the header information that the transmission is destined to the plurality of recipient apparatuses addressed by the group address, enabling the wireless communication apparatus to initialize the channel access when the transmission has ended.

In an embodiment, the method further comprises: determining, on the basis of the header information, whether the transmission is a unicast, multicast, or broadcast transmission; in response to determining on the basis of the header information that the transmission is the unicast transmission, suspending the channel access of the wireless communication apparatus for the determined time period after the transmission, the determined time period comprising a transmission time interval of the at least one subsequent transmission; and in response to determining on the basis of the header information that the transmission is the multicast or the broadcast transmission, enabling the wireless communication apparatus to initialize the channel access when the transmission has ended.

In an embodiment, further comprises: in response to determining on the basis of the header information that the transmission will not be followed by said at least one subsequent transmission, starting a channel contention upon an end of the transmission and enabling the wireless communication apparatus to access the frequency band if the wireless communication apparatus gains a transmission opportunity as a result of the channel contention.

In an embodiment, the method further comprises: in response to determining on the basis of the header information that the transmission is expected to be followed by the at least one subsequent transmission, suspending the channel access of the wireless communication apparatus for the determined time period after the transmission, the determined time period comprising a first quarantine period from an end time of the transmission to a start time of the subsequent transmission, the transmission time interval of the subsequent transmission, and a second quarantine period after an ending time of the subsequent transmission, wherein the second quarantine period is longer than the first quarantine period.

In an embodiment, the suspension comprises shutting down at least some of radio interface components of the wireless communication apparatus for the duration of the suspension.

In an embodiment, if it has been determined that the subsequent transmission is expected, the duration of the suspension is longer than the duration of the transmission, and wherein the suspension ends before an expected end of the subsequent transmission.

In an embodiment, the method further comprises: configuring the wireless communication apparatus to employ a quarantine period after every detected transmission on the frequency band; and in response to determining on the basis of the header information that the transmission will be followed by at least one subsequent transmission, configuring the wireless communication apparatus to employ a longer quarantine period than a quarantine period employed in response to determining on the basis of the header information that the transmission will not be followed by the at least one subsequent transmission.

According to an aspect, there is provided an apparatus comprising means for carrying out any one of the above-described methods.

According to an aspect, there is provided a computer program product embodied on a distribution medium readable by a computer and comprising program instructions which, when loaded into an apparatus, execute any one of the above-described methods. According to an aspect, there is provided a computer-readable distribution medium, e.g. a memory apparatus, configured to store such a computer program product.

According to an aspect, there is provided an apparatus comprising: at least one processor; and at least one memory comprising a computer program code, wherein the at least one memory and the computer program code are configured, with the at least one processor, to cause the apparatus to: process a physical layer convergence protocol header of a transmission received in a wireless communication apparatus on a frequency band; determine from header information comprised in the received physical layer convergence protocol header whether or not at least one subsequent transmission associated with the transmission is expected on the frequency band after the transmission; and in response to determining on the basis of the header information that there will be at least one subsequent transmission after the transmission on the frequency band, suspend channel access of the wireless communication apparatus on the frequency band for a determined time period after the transmission, the determined time period comprising a transmission time interval of the at least one subsequent transmission.

In an embodiment, the transmission is a data transmission, and the at least one memory and the computer program code are configured, with the at least one processor, to cause the apparatus to: determine from the header information comprised in the physical layer convergence protocol header whether or not an acknowledgment message is expected for the data transmission; and in response to determining on the basis of the header information that said acknowledgment message is expected after the data transmission in the radio interface, suspend the channel access of the wireless communication apparatus for said determined time period comprising a transmission time interval of the acknowledgment message.

In an embodiment, the transmission is carried out on a plurality of channels comprising a primary channel always used in transmission by a transmitter apparatus and at least one auxiliary channel selectively used by the transmitter apparatus as additional bandwidth; a separate physical layer convergence protocol header is provided on the primary channel and the at least one auxiliary channel; and the at least one memory and the computer program code are configured, with the at least one processor, to cause the apparatus to receive the physical layer convergence protocol header of the transmission on at least one auxiliary channel of the transmitter apparatus.

In an embodiment, the at least one memory and the computer program code are configured, with the at least one processor, to cause the apparatus to: determine, on the basis of the header information, whether the transmission is destined to a single recipient apparatus to a plurality of recipient apparatuses addressed by a group address, or a plurality of individually addressed recipient apparatuses; in response to determining on the basis of the header information that the transmission is to single recipient apparatus or the plurality of individually addressed recipient apparatuses, suspend the channel access of the wireless communication apparatus for the determined time period after the transmission, the determined time period comprising a transmission time interval of the at least one subsequent transmission; and in response to determining on the basis of the header information that the transmission is destined to the plurality of recipient apparatuses addressed by the group address, cause the wireless communication apparatus to initialize the channel access when the transmission has ended.

In an embodiment, the at least one memory and the computer program code are configured, with the at least one processor, to cause the apparatus to: determine, on the basis of the header information, whether the transmission is a unicast, multicast, or broadcast transmission; in response to determining on the basis of the header information that the transmission is the unicast transmission, suspend the channel access of the wireless communication apparatus for the determined time period after the transmission, the determined time period comprising a transmission time interval of the at least one subsequent transmission; and in response to determining on the basis of the header information that the transmission is the multicast or the broadcast transmission, causing the wireless communication apparatus to initialize the channel access when the transmission has ended.

In an embodiment, the at least one memory and the computer program code are configured, with the at least one processor, to cause the apparatus to: in response to determining on the basis of the header information that the transmission will not be followed by said at least one subsequent transmission, cause the wireless communication apparatus to start a channel contention upon an end of the transmission and cause the wireless communication apparatus to access the frequency band if the wireless communication apparatus gains a transmission opportunity as a result of the channel contention.

In an embodiment, the at least one memory and the computer program code are configured, with the at least one processor, to cause the apparatus to: in response to determining on the basis of the header information that the transmission is expected to be followed by the at least one subsequent transmission, suspend the channel access of the wireless communication apparatus for the determined time period after the transmission, the determined time period comprising a first quarantine period from an end time of the transmission to a start time of the subsequent transmission, the transmission time interval of the subsequent transmission, and a second quarantine period after an ending time of the subsequent transmission, wherein the second quarantine period is longer than the first quarantine period.

In an embodiment, the suspension comprises shutting down at least some of radio interface components of the wireless communication apparatus for the duration of the suspension.

In an embodiment, if it has been determined that the subsequent transmission is expected, the duration of the suspension is longer than the duration of the transmission, and the suspension ends before an expected end of the subsequent transmission.

In an embodiment, the at least one memory and the computer program code are configured, with the at least one processor, to cause the apparatus to: configure the wireless communication apparatus to employ a quarantine period after every detected transmission on the frequency band; and in response to determining on the basis of the header information that the transmission will be followed by at least one subsequent transmission, configure the wireless communication apparatus to employ a longer quarantine period than a quarantine period employed in response to determining on the basis of the header information that the transmission will not be followed by the at least one subsequent transmission.

In an embodiment, the apparatus further comprises radio interface components providing the apparatus with radio communication capability in a wireless communication network employing at least said frequency band.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1A:
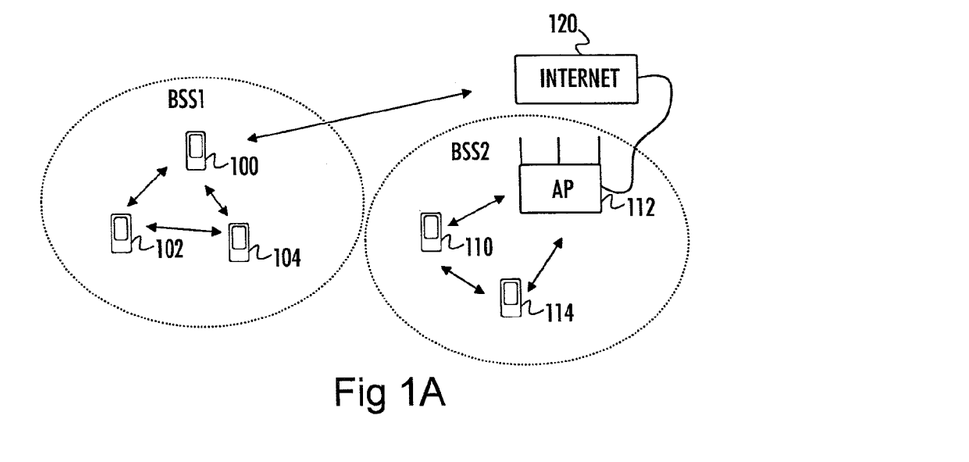
FIG. 1A illustrates communication network to which some embodiments of the invention may be applied.

A general architecture of a wireless telecommunication system to which embodiments of the invention may be applied is illustrated in FIG. 1A. FIG. 1A illustrates two groups of wireless communication devices forming two basic service sets, i.e. groups of wireless communication devices comprising an access point (AP) 100, 112 and terminal stations (STA) 102, 104, 110, 114 communicating with the access points 100, 112 of their respective groups. A basic service set (BSS) is a basic building block of an IEEE 802.11 wireless local area network (WLAN). The most common BSS type is an infrastructure BSS that includes a single AP together with all associated STAs. The AP may be a fixed AP as AP 112, or it may be a mobile AP as AP 100. The APs 100, 112 may also provide access to other networks, e.g. the Internet 120. In another embodiment, at least one of the BSSs is an independent BSS (IBSS) or a mesh BSS (MBSS) without a dedicated AP, and in such embodiments the communication device 100 may be a non-access-point terminal station. While embodiments of the invention are described in the context of the above-described topologies of IEEE 802.11 and, particularly, IEEE 802.11ac, it should be appreciated that other embodiments of the invention are applicable to networks based on other specifications, e.g. other versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptation to coexist with radio access networks based on different specifications and/or standards.

Figure 1B:
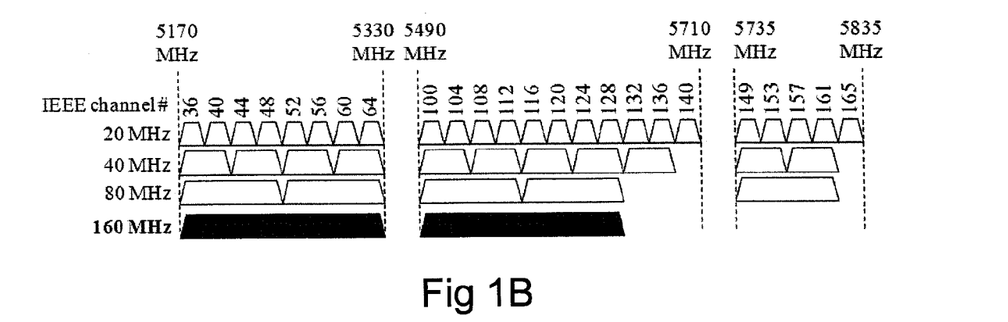
FIG. 1B illustrates a channel allocation principle according to an embodiment.

The 802.11n specifies a data transmission mode that includes 20 MHz wide primary channel and 20 MHz wide auxiliary channels. The primary channel is used in all data transmissions, and with clients supporting only the 20 MHz mode. A further definition in 802.11n is that the primary and auxiliary channels are adjacent. The 802.11n specification also defines a mode in which a STA can have only one auxiliary channel which results in a maximum bandwidth of 40 MHz. IEEE 802.11ac task group extends such an operation model to provide for wider bandwidths by increasing the number of auxiliary channels from 1 up to 7, thus resulting in bandwidths of 20 MHz, 40 MHz, 80 MHz, and 160 MHz. FIG. 1B illustrates an exemplary channel structure for 20 MHz, 40 MHz, 80 MHz, and 160 MHz channels. In this example, a 40 MHz transmission band is formed by two contiguous 20 MHz bands, and an 80 MHz transmission band is formed by two contiguous 40 MHz bands. However, a 160 MHz band may be formed by two contiguous or non-contiguous 80 MHz bands.

As mentioned above, the transmission band of a BSS contains the primary channel and zero or more auxiliary channels. The auxiliary channels may be denoted by secondary, tertiary, quaternary, etc. channels in the order that they may be used in addition to the primary channel, for example. The primary channel is used for channel contention, and a transmission opportunity (TXOP) is gained based on carrier sensing on the primary channel. Every STA has a time duration (defined by a backoff factor), and if the STA detects that the primary channel has been free for the time duration, it gains the TXOP and starts transmission. If another STA gains the TXOP before that, the channel sensing is suspended, and the STA proceeds with the channel sensing after the TXOP of the other STA has ended. The time duration (the backoff factor) may not be reset at this stage, and the time duration that already lapsed before the suspension is also counted, which means that the STA now has a higher probability of gaining the TXOP. A secondary channel may be used in the transmission if it has been free for a determined time period (may be the same or different time period than that used for gaining the TXOP) just before TXOP start time in order for the contending STA to take the secondary channel in use. The same principle may apply to other auxiliary channels. When the TXOP begins, the STA controls the utilization of the primary channel (and other channels of the TXOP. The STA may, for example carry out data transmission to one or a plurality of receiving STAs during the TXOP. The transmission may be transmitted to an individual address, i.e. to a single receiver, in which case the receiver may be defined in a physical layer convergence protocol (PLCP) header and/or a medium access control (MAC) header of the individually addressed transmission. The transmission may alternatively be targeted to a group address having a plurality of receivers, in which case the receivers may be defined separately or by a group address in the PLCP header and/or MAC header. Yet alternatively, the transmission may be targeted to a broadcast address in which case the transmission may be targeted to no predefined receivers, and the broadcast nature may be defined in the header of the data transmission. At least some of the header information may be received by all communication apparatuses that monitor at least one of the channels on which the transmission is carried out. Some of such communication apparatuses may belong to the same BSS as the transmitter apparatus, while other communication apparatuses may belong to one or more different BSSs. The communication apparatuses receiving the header may determine the duration of the transmission from the header information. As a consequence, the communication apparatuses may suspend their access to the same frequencies for the duration of the transmission so as not to cause interference to the transmission. If the transmission is targeted to individual address, the transmission is typically followed by at least one acknowledgment message from a recipient to the transmitter. There may exist a situation where a given communication apparatus is able to detect the transmission but not the acknowledgment and, as a consequence, it may access the frequency band simultaneously with the acknowledgment message. Such a scenario increases the interference and may cause erroneous communication.

Figure 2:
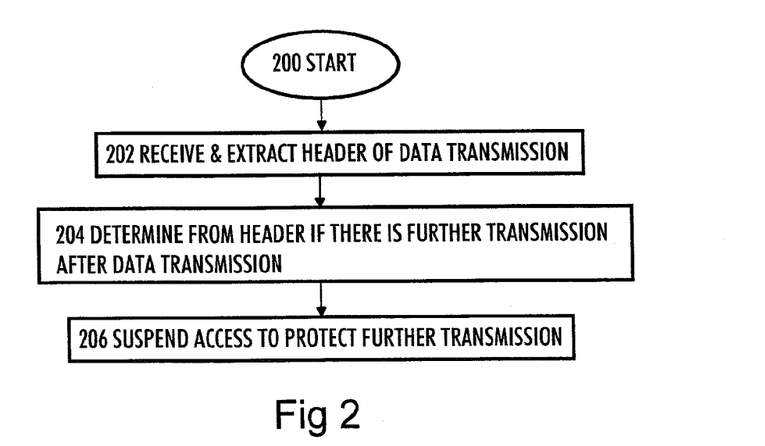
FIG. 2 illustrates a flow diagram of a process according to an embodiment of the invention.

An embodiment of the present invention configures a wireless communication apparatus receiving such a header at a beginning of a data transmission to determine from header information whether or not the data transmission is followed by another transmission and to configure channel access of the wireless communication apparatus on the basis of such determination. The configuration may be carried out in the wireless communication apparatus, e.g. by a controller comprised in the wireless communication apparatus. FIG. 2 illustrates a flow diagram of a process for protecting such further transmissions according to an embodiment of the invention. The process starts in block 200. In block 202, a header of a transmission is received in the wireless communication apparatus over a radio interface on a frequency band. The header may be a physical layer convergence protocol (PLCP) header, and the transmission may be a data transmission or a control transmission. Accordingly, the transmission may comprise a data frame or a control frame, e.g. a Medium Access Control (MAC) management protocol data unit (MMPDU) or another control frame. While the following description mainly discusses that the transmission is the data transmission, the header of the data transmission should not be considered as an essential feature for carrying out the invention, as the header may equally be a header of a control message. The header may be the PLCP header of such a data or control frame or message. In block 204, the wireless communication apparatus determines from header information comprised in the header whether or not there are further transmissions associated with the data transmission and after the data transmission in the radio interface. In response to determining on the basis of the header information that there will be at least one other transmission after the data transmission in the radio interface, the wireless communication apparatus suspends channel access to the frequency band in 206 for a determined time period after the data transmission, the determined time period comprising a transmission time interval of the at least one other transmission. Thus, the wireless communication apparatus extends the suspension of the channel access beyond a transmission time interval of the data transmission in order to avoid simultaneous channel access with such a further transmission. The extended suspension is determined on the basis of the header information contained in the data transmission, wherein the header part and data part of the data transmission are part of the same continuous transmission stream on a physical layer. In an embodiment, the same continuous transmission stream means the same message and/or the same physical layer packet data unit. As a consequence, the performance of the system is improved because of improved interference avoidance, thus resulting in more reliable data transmission in the radio interface. The interference avoidance is achieved by cognitively determining the expected presence or absence of subsequent transmissions on the channel where the header is received.

Figure 3:
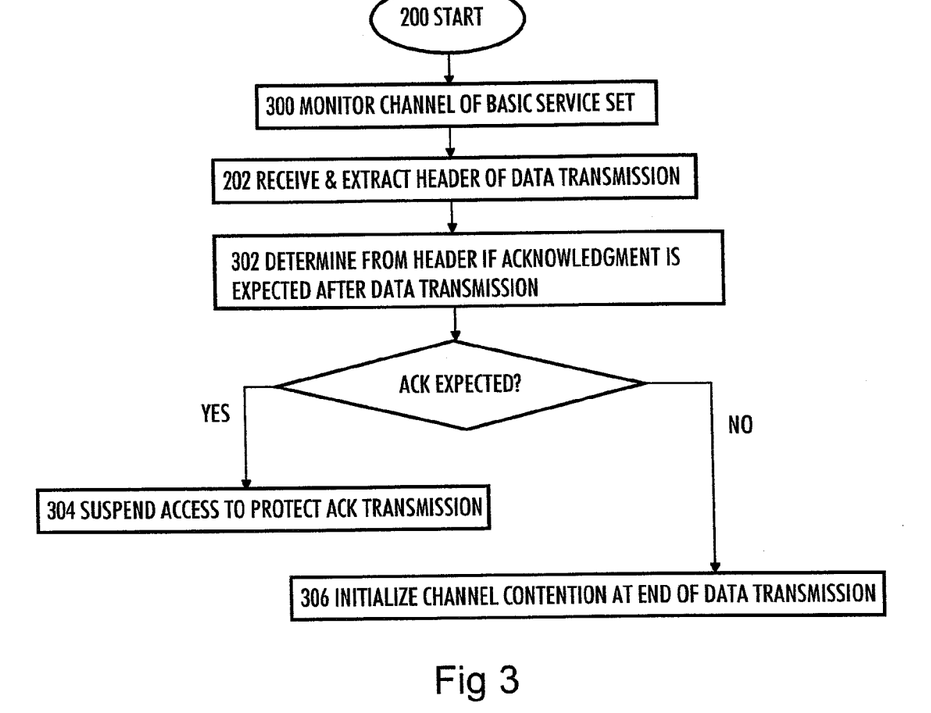
FIG. 3 illustrates a flow diagram of a process where an acknowledgment period of a data transmission is protected.

In an embodiment, the wireless communication apparatus is configured to determine whether the data transmission is followed by the above-mentioned acknowledgment message. FIG. 3 illustrates a flow diagram of a process according to such an embodiment. The flow diagram of FIG. 3 includes steps that correspond to steps of FIG. 2 and, therefore, they are denoted by the same reference numbers. The process starts in block 200. In block 300, the wireless communication apparatus is configured to monitor at least one channel of a given BSS. The BSS whose channel is monitored may by the same or different BSS to which the wireless communication apparatus belongs. The monitored channel(s) may comprise the primary or any one of auxiliary channels (secondary, tertiary, quaternary, etc.). Upon detection of a data transmission on the monitored channel(s), block 202 is carried out, wherein a header of the data transmission is received and processed so as to extract header information contained in the header. In block 302, it is determined on the basis of the header information, whether or not an acknowledgment is expected to follow the data transmission associated with the header. If the acknowledgment is expected on the basis of the analyzed header information, the process proceeds to block 304 where the wireless communication apparatus is configured to suspend access to the channel(s) in which the acknowledgment is transmitted for a determined time interval that lasts at least until an expected end of the acknowledgment message. On the other hand, if no acknowledgment is expected to follow the data transmission on the basis of the analyzed header information, the process proceeds to block 306 where the wireless communication apparatus is configured to initialize channel contention at the end of the data transmission associated with the header. As a consequence, no extra suspension after the end of the data transmission is considered to be necessary, as it is determined that the channel is free for contention immediately after the data transmission.

The determination whether or not there will be further transmission(s) associated with the detected data transmission may be based on determining whether or not the transmission is targeted to individual address or to a group address. The transmission to individual address may be followed by an acknowledgment period by default, while the acknowledgment message may be omitted in transmissions to group address. The transmission type of the data transmission, e.g. unicast, multicast or groupcast, or broadcast, may be determined from address information contained in the header. If the data transmission is addressed to a plurality of recipients, it may be determined to be a multicast (or groupcast) or a broadcast transmission. On the other hand, if only a single recipient is addressed in the header information, the data transmission may be determined to be unicast. In other embodiments, other means for determining the transmission type may be used. For example, the header may explicitly indicate whether it is a unicast, multicast or groupcast, or a broadcast message. In yet another embodiment, the header comprises an information element that explicitly indicates whether or not the subsequent transmission will follow the data transmission. Further embodiments as to how such information is contained in the header will be described below with reference to FIG. 6.

Figure 4:
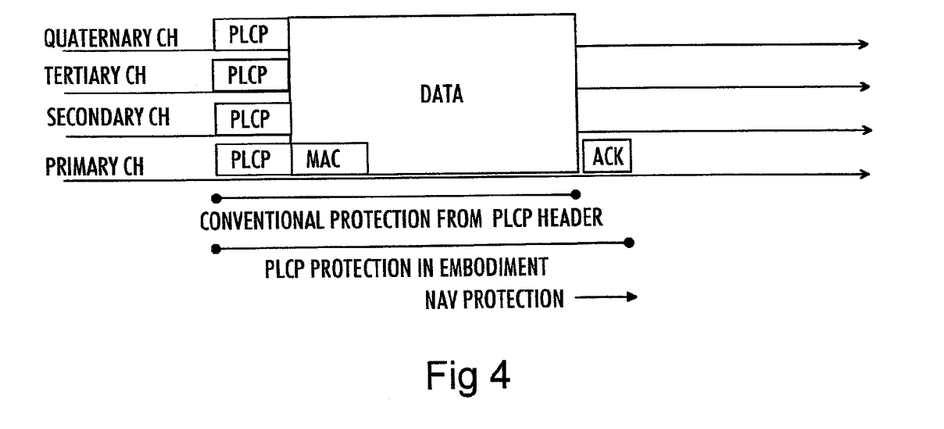
FIGS. 4 and 5 illustrate suspension of channel access according and the length of the suspension according to some embodiments of the invention.

FIG. 4 illustrates an embodiment for protecting the further transmissions. Referring to FIG. 4, a transmitter transmits a protocol packet data unit (PPDU) during its transmission opportunity or transmission time interval. The PPDU may be transmitted on a frequency band comprising the primary channel and, optionally, one or more auxiliary channels. The PPDU may comprise a PLCP header that is transmitted as a separate header on each channel covered by the PPDU, e.g. as a 20 MHz frame header in IEEE 802.11ac. Additionally, the PPDU may comprise a MAC header that may transmitted on the primary channel. The PLCP header contains parameters PPDU payload size and modulation and coding information. This information may be used to calculate the duration of the PPDU and, thus, the wireless communication apparatus may be configured to suspend transmission so as to avoid transmitting during the PPDU transmission, as illustrated in FIG. 4 as the conventional protection from the PLCP header. The wireless communication apparatus may also set its transceiver off for the duration of the transmission to save power when it detects that it is not the recipient of the transmission. The MAC header may contain a duration field that sets a network allocation vector (NAV) in order to prevent communication apparatuses other than the transmitter of the PPDU from accessing the medium after the PPDU transmission, as illustrated in FIG. 4 by the NAV protection. The PPDU may also comprise a data field that carries payload data. The data field may comprise a MAC PDU (MPDU) or an aggregate MPDU (A-MPDU). The transmission time interval may also be a multi-user transmission opportunity, wherein multiple-input-multiple-output (MIMO) streams of a transmission are distributed amongst a plurality of wireless communication apparatuses, each receiving a transmission through a given MIMO stream. As FIG. 4 illustrates, if the PPDU is such a PPDU to which an acknowledgment is required (indicated by header information comprised in the PLCP header), the header information is used to suspend a wireless communication apparatus that is not the transmitter or a recipient of the data transmission from accessing the channel for a time interval that is longer than the duration of the PPDU. In an embodiment, the protection is extended to cover the transmission of the acknowledgment message for the PPDU, as illustrated in FIG. 4 by the PLCP protection in an embodiment. The acknowledgment may be sent on the primary channel or on any one or a plurality of channels used for transmitting the PPDU. The protection is extended inherently to the channel(s) used to convey the acknowledgment and, additionally, the extended suspension applies also to channels that are used to convey the data transmission but not the acknowledgment. As a consequence, the suspension with the extended duration derived from the PLCP header according to some embodiments of the invention provides a protection for the subsequent transmissions which is similar to the NAV protection. However, the extended suspension according to the embodiments may be achieved in a manner different from the NAV protection.

Figure 5:
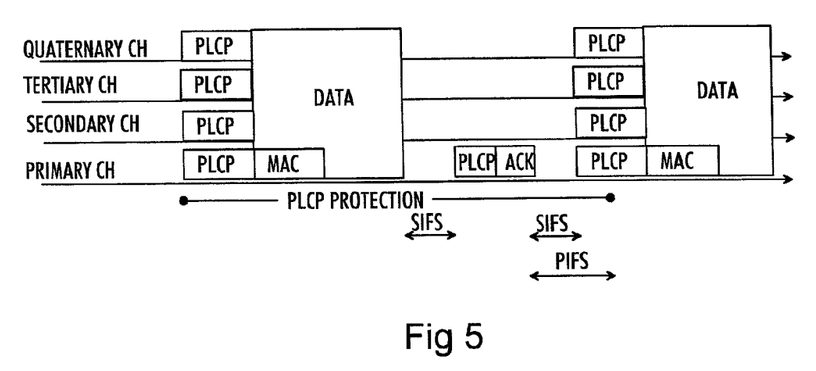

As the MAC header is typically transmitted only on the primary channel, wireless communication apparatuses of the BSS and/or neighboring BSSs not monitoring the primary channel are not able to receive it. Then, the NAV protection provided in a Duration field of the MAC header is not detected by such wireless communication apparatuses, and they cannot suspend the channel access. Therefore, in an embodiment the information enabling the determination whether or not the PPDU is followed by the subsequent transmission is contained in the PLCP header transmitted on each channel of the PPDU such that it may be received by any device that is tuned to monitor for any channel of used for transmitting the PPDU, e.g. any 20 MHz channel. As a consequence, every wireless communication apparatus monitoring for at least one of the channels of the PPDU are able to receive, decode, and extract the PLCP header, thereby being able to determine whether the subsequent transmission (e.g. the acknowledgment) is expected to follow the PPDU. The modulation and coding in the PLCP header may be more robust than the modulation and coding of data frames. Therefore, the PLCP header information may be received and decoded even by receivers with poor link to the transmitter, i.e. the coverage of PLCP headers is larger than the coverage of the data part. Upon determining whether or not the subsequent transmission is expected, the wireless communication apparatus is configured to apply either a short quarantine interval or a long quarantine interval on the basis of the determination. The short quarantine interval may consist of the duration of the PPDU after which the channel contention may be initialized. The long quarantine interval may comprise a time duration comprising the duration of the PPDU, an interval between the end of the PPDU and the start of the acknowledgment message, and the duration of the acknowledgment message, after which the channel contention may be initialized. FIG. 5 illustrates the protection in greater detail.

Referring to FIG. 5, when the transmission of the acknowledgment message is not expected, the wireless communication apparatus suspends the channel access for the calculated duration of the PPDU. When the PPDU has ended, the wireless communication apparatus may initialize the channel contention and acquire channel access, if the channel is sensed to be free for a determined quarantine period (point coordination inter-frame space, PIFS, duration in IEEE 802.11ac). On the other hand, when the transmission of the acknowledgment message is expected, the wireless communication apparatus extends the suspension to cover at least partly the transmission timing of the acknowledgment message, as illustrated in FIG. 5 by the PLCP protection. The wireless communication device may have stored a predetermined duration for the suspension for the case where the acknowledgment message is expected. The predetermined duration may take into account a default duration for the transmission of the acknowledgment message from the end of the data transmission. The recipient of the PPDU may start the transmission of the acknowledgment message after another quarantine period (short inter-frame space, SIFS, in IEEE 802.11ac) which is shorter than the quarantine period (PIFS) used by the wireless communication apparatus. After the transmission of the acknowledgment message is completed, the transmitter of the PPDU may transmit another PPDU if a sum of the other PPDU, acknowledgment, and the current duration of the transmission opportunity (TXOP) is less than a TXOPLimit parameter. The TXOPLimit may be configured to define for how long the transmission may be continued once access to the channel has been gained. The transmitter may start the transmission of the second PPDU after yet another quarantine period from the previous transmission (the acknowledgment message in this case). This quarantine period used by the transmitter may have the same length as the quarantine period used by the recipient before transmitting the acknowledgment (SIFS), while another wireless communication apparatus (that did not transmit the first PPDU) may have to wait for the duration of the longer quarantine period (PIFS) after the completion of the acknowledgment message, provided that the channel is sensed to be free for the duration of the longer quarantine period (PIFS). Therefore, the PLCP protection extends inherently to the subsequent PPDU as well, and the subsequent PPDU may again comprise the header that contains information whether or not the subsequent transmission is followed by another acknowledgment message. As a consequence, the protection may be extended to cover a plurality of PPDUs and a plurality of acknowledgment messages.

If the wireless communication apparatus detects that it is not the receiver of the frame and determines that the acknowledgment period is expected to follow the PPDU transmission, the wireless communication apparatus may set its transceiver off and save power for the duration of PPDU and SIFS+ACK transmission. The wireless communication apparatus may decide to shorten the default duration of the extended suspension by 4 to 16 microseconds in order to be able to monitor for the channel earlier in a case where the duration of the transmission of the acknowledgment message is shorter than a default duration reserved for the transmission of the acknowledgment message.

Above, the SIFS and PIFS are used as examples of the lengths of the quarantine periods, but it should be understood that other quarantine periods and their respective lengths may be used.

Figure 6:
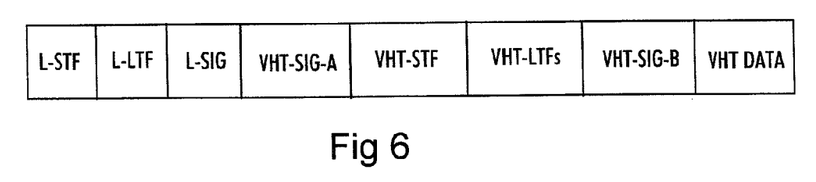
FIG. 6 illustrates a header of a data frame.

As mentioned above, the header, from which the extension of the channel protection may be determined, may be the PLCP header. FIG. 6 illustrates an embodiment of the PLCP header comprised in a very high throughput (VHT) PPDU according to IEEE 802.11ac. The PPDU comprises VHT data and a plurality of control fields: Legacy Short Training Field (L-STF), Legacy Long Training Field (L-LTF), Legacy Long Signal Field (L-SIG), VHT Signal Field A (VHT-SIG-A), VHT Short Training Field (VHT-STF), VHT Long Training Fields (VHT-STFs), and VHT Signal Field B (VHT-SIG-B). The PLCP header may be received by wireless communication apparatuses supporting the VHT feature and legacy wireless communication apparatuses supporting transmission on a lower frequency band consisting of its primary channel. Referring to FIG. 5, even if the data transmission is carried out on an auxiliary channel that is a primary channel of such a legacy apparatus, the legacy apparatus is able to derive the PLCP header and to determine whether or not to apply a prolonged protection on its primary channel (the auxiliary channel of the transmitter of the PPDU).

The information from which the extension of the channel protection may be determined, may be comprised in the VHT-SIG-A field, and it may be determined from a group identifier (Group ID) field and/or $N_{STS}$ (Number of Streams) of Table 1 below.

TABLE 1

| Bit Index | Field | Bit allocation | Description |
|---|---|---|---|
| | | | VHT-SIG-A1 |
| 0-1 | BW | 2 | Set to 0 for 20 MHz, 1 for 40 MHz, 2 for 80 MHz, 3 for 160 MHz and 80 + 80 MHz mode |
| 2 | Reserved | 1 | Reserved for possible expansion of BW field. Set to 1. |
| 3 | STBC | 1 | Set to 1 if all streams use STBC, otherwise set to 0. When STBC bit is 1, an odd number of space time streams per user is not allowed. |
| 4-9 | Group ID [10/0582r1] | 6 | A value of all ones indicates [10/0382r2]: A single user transmission A transmission where the group membership has not yet been established A transmission that needs to bypass a group (e.g. broadcast) |
| 10-21 | $N_{STS}$ [10/0582r1] | 12 | For MU: 3 bits/user with maximum of 4 users Set to 0 for 0 space time streams Set to 1 for 1 space time stream Set to 2 for 2 space time streams Set to 3 for 3 space time streams Set to 4 for 4 space time streams Otherwise: first 3 bits contain stream allocation, set to 0 for 1 space time stream, set to 1 for 2 space time streams, etc. up to 8 streams. Remaining 9 bits contain partial AID: being the 9 LSB bits of AID. For Broadcast and multicast, these 9 bits are set to 0. For STA-to-AP, these 9 bits are set to a special value (TBD). |
| 22-23 | Reserved | 2 | All ones |
| | Total | 24 | |
| | | | VHT-SIG-A2 |
| 0-1 | Short GI | 2 | Set B0 to 0 for Long GI, set to 1 for Short GI Set B1 to 1 when Short GI and $N_{sym}$ % 10 == 9 |
| 2-3 | Coding | 2 | Set B2 to 0 for BCC, set to 1 for LDPC B3 purpose is under discussion |
| 4-7 | MCS | 4 | For SU/Broadcast/Multicast: MCS index For MU: Reserved, set to all ones |
| 8 | SU-Beamformed | 1 | Set to 1 when packet is a SU-beamformed packet Set to 0 otherwise For MU: Reserved, set to 1 |
| 9 | Reserved | 1 | All ones |
| 10-17 | CRC | 8 | CRC calculated as in 11n Section 20.3.9.4.4 with C7 in B10 |
| 18-23 | Tail | 6 | All zeros |
| | Total | 24 | |

With respect to the Group ID field, if the Group ID field indicates that the data transmission comprising the PLCP header considered herein is a single-user transmission, the Nsts following the group ID describes whether the transmission addressed to an individual address or to a group or a broadcast address. If the transmission is targeted to individual address (last 9 bits of the $N_{STS}$ field include non-zero value(s)), it may be determined that the acknowledgment period is expected and, thus, the suspension is extended to cover the acknowledgment period. If the transmission is targeted to group address (last 9 bits of the $N_{STS}$ field are zero values), it may be determined that the acknowledgment period is not expected and, thus, no extra suspension is set.

When the Group ID field is set to indicate multi-user transmission, it may be determined that the acknowledgement period is expected and, thus, the suspension is extended to cover the acknowledgment period.

In another embodiment, the bit locations 0 and 1 in Group ID field may have dedicated meaning. Bits in those bit locations may be set to 00 to indicate that the transmission will not be followed by an acknowledgment transmission period, and the transmitter apparatus (TXOP holder) will not continue to transmit. The bits may be set to 01 to indicate that the transmitter apparatus will continue to transmit after transmitting the PPDU, and the bits may be set to 10 to indicate that the transmitter apparatus itself has an acknowledgment transmission period after the data transmission in order to transmit an acknowledgment message to another wireless communication unit. Value 11 may be reserved.

It should be understood that the invention is not bound to the PLCP header and the VHT signal fields of the IEEE 802.11ac. In general, the wireless communication apparatus according to an embodiment of the invention may determine from another header than those described above, whether or not the data transmission comprising the header is followed by subsequent transmissions that also should be protected. The header may be received on a channel that is an auxiliary channel of the transmitter of the data transmission, and the header may be copied to every channel (primary and every auxiliary channel) of the data transmission so as to enable its detection on each channel separately. In an embodiment, the wireless communication apparatus receiving the header is configured to determine whether the data transmission is addressed to a group or to an individual recipient. The determination may be based on a header information element indicative of the number of recipients for the data transmission. When the data transmission is determined to be addressed to a group of recipients, the suspension may be terminated at the end of the data transmission. Otherwise, the suspension may be extended to cover the subsequent transmission linked operationally to the data transmission, e.g. the acknowledgment. In another embodiment, the wireless communication apparatus receiving the header is configured to determine whether the data transmission is a multicast, broadcast, or unicast transmission. When the data transmission is determined to be multicast or broadcast, the suspension may be terminated at the end of the data transmission. In the case of unicast, the suspension may be extended to cover the subsequent transmission linked operationally to the data transmission, e.g. the acknowledgment.

Figure 7:
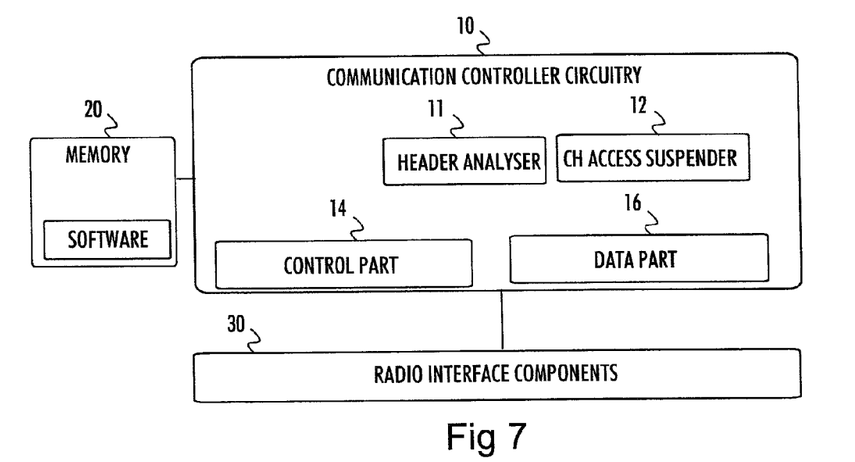
FIG. 7 illustrates a block diagram of an apparatus according to an embodiment of the invention.

FIG. 7 illustrates an embodiment of an apparatus comprising means for carrying out the above-described functionalities of the wireless communication apparatus that determines whether or not to extend the suspension beyond the data transmission. The apparatus may be a wireless communication apparatus of an IEEE 802.11 network or another wireless network, e.g. an AP or STA. The wireless communication apparatus may be a computer (PC), a laptop, a cellular phone, a palm computer, a fixed base station operating as the AP, or any other communication apparatus. In another embodiment, the apparatus comprises a circuitry, e.g. a chip, a chipset, a processor, a micro controller, or a combination of such circuitries that may be installed to the wireless communication apparatus.

The apparatus may comprise a communication controller circuitry 10 configured to control the communications in the wireless communication apparatus. The communication controller circuitry 10 may comprise a control part 14 handling control signaling communication with respect to transmission, reception, and extraction of control frames and assembling and extracting control headers associated with data transmissions. The communication controller circuitry 10 may further comprise a data part 16 that handles transmission and reception of payload data. The control part 14 may also be configured to tune the wireless communication apparatus to monitor and receive signals on at least those channels that are used by a BSS of the wireless communication apparatus as communication channels. The channels being monitored may comprise communication channels of another BSS as well, as described above. As a consequence, the control part 14 may be configured to monitor and receive control messages and headers, e.g. the PLCP header, received on the monitored channels, decode and extract information contained in the received control messages and headers.

The communication controller circuitry 10 may further comprise a header analyzer circuitry 11 configured to receive extracted header information (bits) from the control part 14. This may be preceded a determination in the control part that the header indicates that the wireless communication apparatus is not a recipient of the data transmission. The extracted header information may comprise a determined field of the header received and extracted by the control part, e.g. a field that enables the determination whether or not data transmission associated with the header information is followed by another transmission. Such a field may comprise the group ID field and/or the $N_{STS}$, as described above. On the basis of the received header information, the header analyzer circuitry 11 may carry out step 204 of FIG. 2 so as to determine whether or not the subsequent transmission is expected. If the subsequent transmission is expected, the header analyzer circuitry 11 may provide a corresponding signal to a channel suspender circuitry 12 configured to control channel access of the wireless communication apparatus. Upon reception of the signal indicating that the data transmission comprising the header analyzed by the header analyzer circuitry 11 is not expected to be followed by another transmission, the channel access suspender circuitry 12 controls the data part 16 and the control part 14 to suspend transmission at least on the channel(s) on which the header was received for the duration of the data transmission. Reception and channel monitoring on those channels may be maintained, or the reception may also be suspended in order to save power. Upon reception of the signal indicating that the data transmission comprising the header analyzed by the header analyzer circuitry 11 is expected to be followed by another transmission, the channel access suspender circuitry 12 controls the data part 16 and the control part 14 to suspend transmission at least on the channel(s) on which the header was received for a duration that is longer than the duration of the data transmission, as described above.

The circuitries 11 to 16 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 11 to 16 or all of them.

The apparatus may further comprise a memory 20 that stores computer programs (software) configuring the apparatus to perform the above-described functionalities of the wireless communication apparatus. The memory 20 may also store communication parameters and other information needed for the wireless communications, e.g. default values for the duration of suspension in each case. The apparatus may further comprise radio interface components 30 providing the apparatus with radio communication capabilities within the BSS and with other BSSs. The radio interface components 30 may comprise standard well-known components such as amplifier, filter, frequency-converter, (de) modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the communication apparatus comprises at least one processor and at least one memory including a computer program code, wherein the at least one memory and the computer program code are configured, with the at least one processor, to cause the apparatus to carry out the steps of the process of FIG. 2. In further embodiments, the at least one memory and the computer program code are configured, with the at least one processor, to cause the apparatus to carry out any one of the embodiments related to suspend the radio access of the wireless communication device so as to protect further transmissions associated with data transmission with a header being analyzed according to embodiments of the invention, as described above in connection with FIGS. 2 to 6. Accordingly, the at least one processor, the memory, and the computer program code form processing means for carrying out embodiments of the present invention in the wireless communication apparatus.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and a memory or memories that work together to cause the apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or a portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in connection with FIGS. 2 to 6 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless telecommunication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
receiving, in a wireless communication apparatus, a physical layer convergence protocol header of a transmission on a frequency band;
determining from header information comprised in the physical layer convergence protocol header whether or not at least one subsequent transmission associated with the transmission is expected on the frequency band after the transmission; and
in response to determining on the basis of the header information that there will be at least one subsequent transmission after the transmission on the frequency band, suspending channel access of the wireless communication apparatus on the frequency band for a determined time period after the transmission, the determined time period comprising a transmission time interval of the at least one subsequent transmission.

2. The method of claim 1, wherein the transmission is a data transmission, the method further comprising:
determining from the header information comprised in the physical layer convergence protocol header whether or not an acknowledgment message is expected for the data transmission; and
in response to determining on the basis of the header information that said acknowledgment message is expected after the data transmission in the radio interface, suspending the channel access of the wireless communication apparatus for said determined time period comprising a transmission time interval of the acknowledgment message.

3. The method of claim 1, wherein the transmission is carried out on a plurality of channels comprising a primary channel always used in transmission by a transmitter apparatus and at least one auxiliary channel selectively used by the transmitter apparatus as additional bandwidth, and wherein a separate physical layer convergence protocol header is provided on the primary channel and the at least one auxiliary channel, the method further comprising receiving the physical layer convergence protocol header of the transmission on at least one auxiliary channel of the transmitter apparatus.

4. The method of claim 1, further comprising: determining, on the basis of the header information, whether the transmission is destined to a single recipient apparatus to a plurality of recipient apparatuses addressed by a group address, or a plurality of individually addressed recipient apparatuses;
in response to determining on the basis of the header information that the transmission is to single recipient apparatus or the plurality of individually addressed recipient apparatuses, suspending the channel access of the wireless communication apparatus for the determined time period after the transmission, the determined time period comprising a transmission time interval of the at least one subsequent transmission; and in response to determining on the basis of the header information that the transmission is destined to the plurality of recipient apparatuses addressed by the group address, enabling the wireless communication apparatus to initialize the channel access when the transmission has ended.

5. The method of claim 1, further comprising:

determining, on the basis of the header information, whether the transmission is a unicast, multicast, or broadcast transmission;

in response to determining on the basis of the header information that the transmission is the unicast transmission, suspending the channel access of the wireless communication apparatus for the determined time period after the transmission, the determined time period comprising a transmission time interval of the at least one subsequent transmission; and in response to determining on the basis of the header information that the transmission is the multicast or the broadcast transmission, enabling the wireless communication apparatus to initialize the channel access when the transmission has ended.

6. The method of claim 1, further comprising: in response to determining on the basis of the header information that the transmission will not be followed by said at least one subsequent transmission, starting a channel contention upon an end of the transmission and enabling the wireless communication apparatus to access the frequency band if the wireless communication apparatus gains a transmission opportunity as a result of the channel contention.

7. The method of claim 1, further comprising: in response to determining on the basis of the header information that the transmission is expected to be followed by the at least one subsequent transmission, suspending the channel access of the wireless communication apparatus for the determined time period after the transmission, the determined time period comprising a first quarantine period from an end time of the transmission to a start time of the subsequent transmission, the transmission time interval of the subsequent transmission, and a second quarantine period after an ending time of the subsequent transmission, wherein the second quarantine period is longer than the first quarantine period.

8. The method of claim 1, wherein the suspension comprises shutting down at least some of radio interface components of the wireless communication apparatus for the duration of the suspension.

9. The method of claim 1, wherein if it has been determined that the subsequent transmission is expected, the duration of the suspension is longer than the duration of the transmission, and wherein the suspension ends before an expected end of the subsequent transmission.

10. The method of claim 1, further comprising:

configuring the wireless communication apparatus to employ a quarantine period after every detected transmission on the frequency band; and in response to determining on the basis of the header information that the transmission will be followed by at least one subsequent transmission, configuring the wireless communication apparatus to employ a longer quarantine period than a quarantine period employed in response to determining on the basis of the header information that the transmission will not be followed by the at least one subsequent transmission.

11. An apparatus comprising:
at least one processor; and
at least one memory comprising a computer program code, wherein the at least one memory and the computer program code are configured, with the at least one processor, to cause the apparatus to:
  process a physical layer convergence protocol header of a transmission received in a wireless communication apparatus on a frequency band;
  determine from header information comprised in the received physical layer convergence protocol header whether or not at least one subsequent transmission associated with the transmission is expected on the frequency band after the transmission; and
  in response to determining on the basis of the header information that there will be at least one subsequent transmission after the transmission on the frequency band, suspend channel access of the wireless communication apparatus on the frequency band for a determined time period after the transmission, the determined time period comprising a transmission time interval of the at least one subsequent transmission.

12. The apparatus of claim 11, wherein the transmission is a data transmission, and wherein the at least one memory and the computer program code are configured, with the at least one processor, to cause the apparatus to:
  determine from the header information comprised in the physical layer convergence protocol header whether or not an acknowledgment message is expected for the data transmission; and
  in response to determining on the basis of the header information that said acknowledgment message is expected after the data transmission in the radio interface, suspend the channel access of the wireless communication apparatus for said determined time period comprising a transmission time interval of the acknowledgment message.

13. The apparatus of claim 11, wherein the transmission is carried out on a plurality of channels comprising a primary channel always used in transmission by a transmitter apparatus and at least one auxiliary channel selectively used by the transmitter apparatus as additional bandwidth, wherein a separate physical layer convergence protocol header is provided on the primary channel and the at least one auxiliary channel, and wherein the at least one memory and the computer program code are configured, with the at least one processor, to cause the apparatus to receive the physical layer convergence protocol header of the transmission on at least one auxiliary channel of the transmitter apparatus.

14. The apparatus of claim 11, wherein the at least one memory and the computer program code are configured, with the at least one processor, to cause the apparatus to:
  determine, on the basis of the header information, whether the transmission is destined to a single recipient apparatus to a plurality of recipient apparatuses addressed by a group address, or a plurality of individually addressed recipient apparatuses;
  in response to determining on the basis of the header information that the transmission is to single recipient apparatus or the plurality of individually addressed recipient apparatuses, suspend the channel access of the wireless communication apparatus for the determined time period after the transmission, the determined time period comprising a transmission time interval of the at least one subsequent transmission; and
  in response to determining on the basis of the header information that the transmission is destined to the plurality of recipient apparatuses addressed by the group address, cause the wireless communication apparatus to initialize the channel access when the transmission has ended.

15. The apparatus of claim 11, wherein the at least one memory and the computer program code are configured, with the at least one processor, to cause the apparatus to:

determine, on the basis of the header information, whether the transmission is a unicast, multicast, or broadcast transmission;

in response to determining on the basis of the header information that the transmission is the unicast transmission, suspend the channel access of the wireless communication apparatus for the determined time period after the transmission, the determined time period comprising a transmission time interval of the at least one subsequent transmission; and in response to determining on the basis of the header information that the transmission is the multicast or the broadcast transmission, causing the wireless communication apparatus to initialize the channel access when the transmission has ended.

16. The apparatus of claim 11, wherein the at least one memory and the computer program code are configured, with the at least one processor, to cause the apparatus to:

in response to determining on the basis of the header information that the transmission will not be followed by said at least one subsequent transmission, cause the wireless communication apparatus to start a channel contention upon an end of the transmission and cause the wireless communication apparatus to access the frequency band if the wireless communication apparatus gains a transmission opportunity as a result of the channel contention.

17. The apparatus of claim 11, wherein the at least one memory and the computer program code are configured, with the at least one processor, to cause the apparatus to:

in response to determining on the basis of the header information that the transmission is expected to be followed by the at least one subsequent transmission, suspend the channel access of the wireless communication apparatus for the determined time period after the transmission, the determined time period comprising a first quarantine period from an end time of the transmission to a start time of the subsequent transmission, the transmission time interval of the subsequent transmission, and a second quarantine period after an ending time of the subsequent transmission, wherein the second quarantine period is longer than the first quarantine period.

18. The apparatus of claim 11, wherein the suspension comprises shutting down at least some of radio interface components of the wireless communication apparatus for the duration of the suspension.

19. The apparatus of claim 11, wherein if it has been determined that the subsequent transmission is expected, the duration of the suspension is longer than the duration of the transmission, and wherein the suspension ends before an expected end of the subsequent transmission.

20. The apparatus of claim 11, wherein the at least one memory and the computer program code are configured, with the at least one processor, to cause the apparatus to:

configure the wireless communication apparatus to employ a quarantine period after every detected transmission on the frequency band; and in response to determining on the basis of the header information that the transmission will be followed by at least one subsequent transmission, configure the wireless communication apparatus to employ a longer quarantine period than a quarantine period employed in response to determining on the basis of the header information that the transmission will not be followed by the at least one subsequent transmission.

21. The apparatus of claim 11, further comprising radio interface components providing the apparatus with radio communication capability in a wireless communication network employing at least said frequency band.

22. A computer program product embodied on a non-transitory distribution medium readable by a computer and comprising program instructions which, when loaded into an apparatus, execute a computer process comprising:

processing a physical layer convergence protocol header of a transmission received in a wireless communication apparatus on a frequency band;

determining from header information comprised in the physical layer convergence protocol header whether or not at least one subsequent transmission associated with the transmission is expected on the frequency band after the transmission; and in response to determining on the basis of the header information that there will be at least one subsequent transmission after the transmission on the frequency band, suspending channel access of the wireless communication apparatus on the frequency band for a determined time period after the transmission, the determined time period comprising a transmission time interval of the at least one subsequent transmission.

* * * * *